United States Patent
Han et al.

(10) Patent No.: US 11,188,102 B2
(45) Date of Patent: Nov. 30, 2021

(54) METHOD, APPARATUS AND STORAGE MEDIUM FOR CONTROLLING DRAINAGE OF EQUIPMENT

(71) Applicant: BEIJING XIAOMI MOBILE SOFTWARE CO., LTD., Beijing (CN)

(72) Inventors: Jin Han, Beijing (CN); Hualin Ye, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 250 days.

(21) Appl. No.: 16/454,417

(22) Filed: Jun. 27, 2019

(65) Prior Publication Data
US 2020/0004273 A1  Jan. 2, 2020

(30) Foreign Application Priority Data

Jun. 27, 2018 (CN) .......................... 201810681612.X

(51) Int. Cl.
| | | |
|---|---|---|
| *G05D 7/06* | (2006.01) | |
| *G06T 7/00* | (2017.01) | |
| *E03C 1/12* | (2006.01) | |
| *G05B 19/4155* | (2006.01) | |

(52) U.S. Cl.
CPC ............ *G05D 7/0623* (2013.01); *E03C 1/12* (2013.01); *G05B 19/4155* (2013.01); *G06T 7/97* (2017.01); *G05B 2219/41303* (2013.01); *G06T 2207/10004* (2013.01)

(58) Field of Classification Search
CPC ...... G05D 7/0623; G05D 9/12; G05D 7/0676; G06T 7/97; G06T 2207/10004; E03C 1/12; G05B 19/4155; G05B 2219/41303
See application file for complete search history.

(56) References Cited

U.S. PATENT DOCUMENTS

| | | | | |
|---|---|---|---|---|
| 4,684,327 A | * | 8/1987 | Gentiluomo | D06F 39/082 417/38 |
| 5,125,247 A | * | 6/1992 | Mills | D06F 39/081 68/208 |

(Continued)

FOREIGN PATENT DOCUMENTS

| | | |
|---|---|---|
| CN | 103023582 B | 12/2014 |
| CN | 104697587 A | 6/2015 |

(Continued)

OTHER PUBLICATIONS

Extended European Search Report of EP Application No. 19182036.4, dated Oct. 31, 2019, (9p).

(Continued)

*Primary Examiner* — Thomas C Lee
*Assistant Examiner* — Michael Tang
(74) *Attorney, Agent, or Firm* — Arch & Lake LLP

(57) ABSTRACT

Disclosed is a method, apparatus and storage medium for controlling drainage of equipment. The method includes: determining that the equipment is in a drain state; detecting whether a floor drain connected to a drain pipe of the equipment is at risk of drainage overflow or a drainage overflow occurs; and when it is detected that the floor drain is at risk of drainage overflow or the drainage overflow occurs, reducing an amount of water discharging from the drain pipe per unit time.

17 Claims, 5 Drawing Sheets

(56) References Cited

U.S. PATENT DOCUMENTS

| | | | | |
|---|---|---|---|---|
| 5,493,877 A | * | 2/1996 | Wickremasinghe | D06F 39/081 68/208 |
| 7,088,829 B1 | * | 8/2006 | Schick | B60Q 5/00 381/61 |
| 2008/0317447 A1 | * | 12/2008 | Lentz | F22B 1/284 392/326 |
| 2011/0088801 A1 | * | 4/2011 | Ramirez-Diaz | F16K 37/005 137/614.04 |
| 2012/0025336 A1 | * | 2/2012 | Inoue | H04R 19/005 257/416 |
| 2019/0062982 A1 | * | 2/2019 | Li | D06F 37/36 |
| 2020/0056818 A1 | * | 2/2020 | Ishiyama | F25B 31/004 |
| 2020/0354940 A1 | * | 11/2020 | Obrist | E03D 1/14 |

FOREIGN PATENT DOCUMENTS

| | | | | |
|---|---|---|---|---|
| CN | 106801463 A | | | 6/2017 |
| CN | 106835971 A | | | 6/2017 |
| CN | 107218518 A | | | 9/2017 |
| CN | 107355686 A | | | 11/2017 |
| CN | 108185962 A | | | 6/2018 |
| JP | 02223887 A | * | | 9/1990 |
| JP | 2012024540 A | * | | 2/2012 |
| WO | 2010039045 A1 | | | 4/2010 |

OTHER PUBLICATIONS

Chinese First Office Action issued in CN201810681612.X, dated Nov. 16, 2020, 9 pages.

Chinese Second Office Action issued in CN201810681612.X, dated May 12, 2021, 7 pages.

* cited by examiner

METHOD, APPARATUS AND STORAGE MEDIUM FOR CONTROLLING DRAINAGE OF EQUIPMENT

CROSS REFERENCE TO RELATED APPLICATION

The present disclosure is based on and claims priority of Chinese Patent Application No. 2018/10681612.X filed on Jun. 27, 2018, and the entire content of which is hereby incorporated by reference.

TECHNICAL FIELD

The disclosure relates to the technical field of automatic control, and in particular, relates to a method, apparatus and storage medium for controlling drainage of equipment.

BACKGROUND

Some household electrical appliances, such as washing machines, are provided with a drain pipe, which is connected to a floor drain to drain water, i.e., to introduce the water discharged from the equipment into underfloor drain pipe. For example, the waste water flows into the floor drain through the drain pipe after a washing cycle is finished. However, the water discharged from the drain pipe sometimes overflows from the floor drain onto the floor, which affects not only the cleanliness of the floor, but also the life expectancy and the safety of the equipment when the equipment is soaked in the water.

SUMMARY

The present disclosure provides a method, apparatus and storage medium for controlling drainage of equipment.

According to a first aspect of the present disclosure, there is provided a method for controlling drainage of equipment, the equipment is provided with a drain pipe, and the method includes: determining that the equipment is in a drain state; detecting whether a floor drain connected to the drain pipe of the equipment is at risk of drainage overflow or a drainage overflow occurs; and when it is detected that the floor drain is at risk of drainage overflow or the drainage overflow occurs, reducing an amount of water discharging from the drain pipe per unit time.

According to a second aspect of the present disclosure, there is provided an apparatus for controlling drainage of equipment, the equipment is provided with a drain pipe, and the apparatus includes: a processor; a memory for storing instructions executable by the processor; wherein the processor is configured to: determine that the equipment is in a drain state; detect whether a floor drain connected to the drain pipe of the equipment is at risk of drainage overflow or a drainage overflow occurs; and reduce an amount of water discharging from the drain pipe per unit time when it is detected that the floor drain is at risk of drainage overflow or the drainage overflow occurs.

According to a third aspect of the present disclosure, there is provided a non-transitory computer-readable storage medium having instructions stored therein, wherein the instructions, when executable by a processor, causes the processor to perform determining that equipment is in a drain state; detecting whether a floor drain connected to a drain pipe of the equipment is at risk of drainage overflow or a drainage overflow occurs; and reducing an amount of water discharging from the drain pipe per unit time when it is detected that the floor drain is at risk of drainage overflow or the drainage overflow occurs.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference is made in detail to exemplary aspects, examples of which are illustrated in the accompanying drawings. The following description refers to the accompanying drawings in which the same numerals in different drawings represent the same or similar elements unless otherwise indicated. The implementations set forth in the following description of exemplary aspects do not represent all implementations consistent with the disclosure. Instead, they are merely examples of apparatuses and methods consistent with aspects related to the disclosure.

The terminology used in the present disclosure is for the purpose of describing particular examples only and is not intended to limit the present disclosure. As used in this disclosure and the appended claims, the singular forms "a", "an", and "the" are intended to include the plural forms as well, unless the context clearly indicates otherwise. It should also be understood that the term "and/or" as used herein refers to and includes any and all possible combinations of one or more of the associated listed items.

It should be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
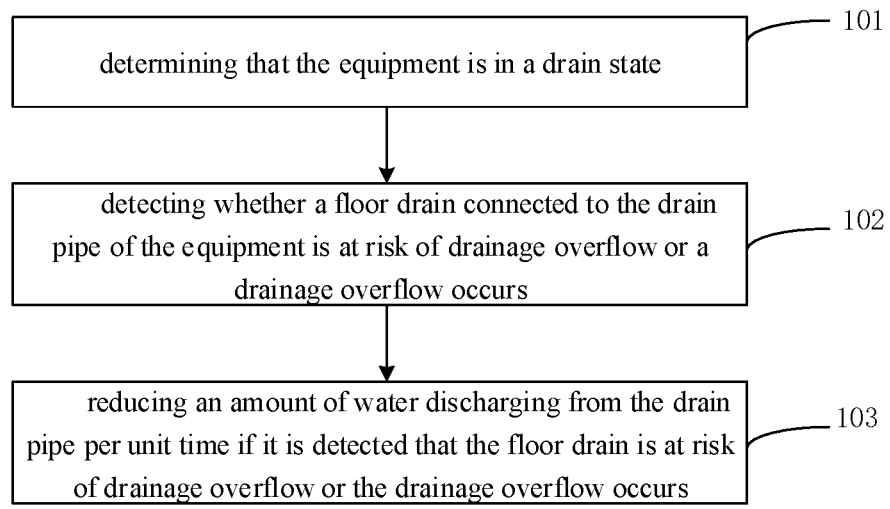
FIG. 1 is a flow chart of a method for controlling drainage of equipment according to an example.

FIG. 1 is a flow chart of a method for controlling drainage of equipment according to an example, wherein the equipment may be a smart home appliance, such as a washing machine, a water purifier, or a dishwasher, etc., and the equipment is provided with a drain pipe. As shown in FIG. 1, the method includes the following steps.

Step 101: determining that the equipment is in a drain state.

In a practical manner, the equipment may be determined to be in a drain state according to operational status information of the equipment. For example, the washing machine is in a drain mode, that is, it enters the drain state.

Optionally, a water immersion sensor may be disposed at a preset position in the drain pipe, and when the water immersion sensor detects water in the drain pipe, it is determined that the equipment enters the drain state.

Step 102: detecting whether a floor drain connected to the drain pipe of the equipment is at risk of drainage overflow or a drainage overflow occurs. For example, the equipment may communicate with one or more sensors that detect floor drain connected to the drain pipe of the equipment and determine whether the drain pipe of the equipment is at risk of drainage overflow.

Detecting whether a floor drain connected to the drain pipe is at risk of drainage overflow can be realized by determining whether the water in the floor drain is about to overflow, or by determining whether the water to be discharged from the drain pipe exceeds the discharge amount of the floor drain or water discharge capacity of the floor drain. For example, when the water in the floor drain is about to overflow or the water to be discharged from the drain pipe exceeds the discharge capacity of the floor drain, there may be a situation where the drain pipe shakes sharply, a small amount of water overflows around the drain pipe, there is a gurgling sound around the drain pipe, or the water level in the floor drain exceeds a specified position in the floor drain. Therefore, the above situations may be monitored by collecting information around the drain pipe and the floor drain to determine whether the floor drain is at risk of drainage overflow or drainage overflow occurs.

In this example, the cause of overflowing or risk of overflowing may include but is not limited to: the water discharged per unit time is too large; the floor drain is clogged (for example, blocked by hair, etc.); there is too much water in the underfloor or underground drain pipe connected with the floor drain, etc.

Step 103: reducing an amount of water discharging from the drain pipe per unit time, when it is detected that the floor drain is at risk of drainage overflow or the drainage overflow occurs.

The amount of water discharging from the drain pipe per unit time may be reduced or adjusted by controlling the opening of the electronic valve provided in the drain pipe, or by controlling the water pump power in the equipment. Accordingly, the equipment may control the water pump to adjust the water discharging rate based on whether the floor drain is at risk of drainage overflow. The equipment may turn off one or more water pumps to stop water inflow to the equipment as well as the water discharging when it is detected that the drainage overflow occurs.

When the equipment is in the drain state, the method for controlling drainage of equipment provided by this example detects whether the floor drain connected with the drain pipe is at risk of drainage overflow or the drainage overflow occurs, and reduces the amount of water discharging from the drain pipe when there is a risk of drainage overflow or the drainage overflow occurs, which may avoid the problem that the water discharged from the equipment drain pipe overflows from the floor drain and improve the safety of the equipment.

In a practical manner, detecting whether a floor drain connected to the drain pipe of the equipment is at risk of drainage overflow or the drainage overflow occurs may include: detecting whether the floor drain is at risk of drainage overflow or the drainage overflow occurs according to at least one of the following items: an image of the drain pipe, a sound around the drain pipe, a water level in the floor drain, and a drain rate, which may also be referred to as a flow rate or a discharge rate, of the floor drain. The sound around the drain pipe may be any one or more of the sound of the water flow in the drain pipe, the sound of the water flow near the floor drain, the sound of the water flow in the floor drain, or the sound of shake of the drain pipe. The sound of the water flow in the drain pipe and/or the sound of shake of the drain pipe may be collected by a sound collecting device provided on the drain pipe, and the sound of the water flow in the vicinity of the floor drain or in the floor drain may be collected by a sound collecting device provided near the floor drain.

In a practical manner, an image for determining whether the floor drain is at risk of drainage overflow or the drainage overflow occurs may include at least two images of the drain pipe collected at different times, and the image collection operation may be performed periodically during the drainage process of the equipment. For example, the images may be taken every four or five seconds. A camera may be installed around the drain pipe to shoot around the drain pipe, or a camera of the equipment may be used to take pictures around the drain pipe, or the equipment may cooperate with a camera nearby, for example it may communicate with a mobile phone or a smart camera to request the mobile phone or smart camera to take a picture around the drain pipe.

The method for controlling the drainage of the equipment according to the example of the present disclosure detects whether the floor drain connected to the drain pipe is at risk of drainage overflow or drainage overflow occurs when the equipment is in a drain state, and reduces the amount of water discharging from the drain pipe when the floor drain is at risk of drainage overflow or the drainage overflow occurs, which may avoid that the water discharged from the drain pipe overflows from the floor drain and improve the safety of the equipment.

Figure 2:
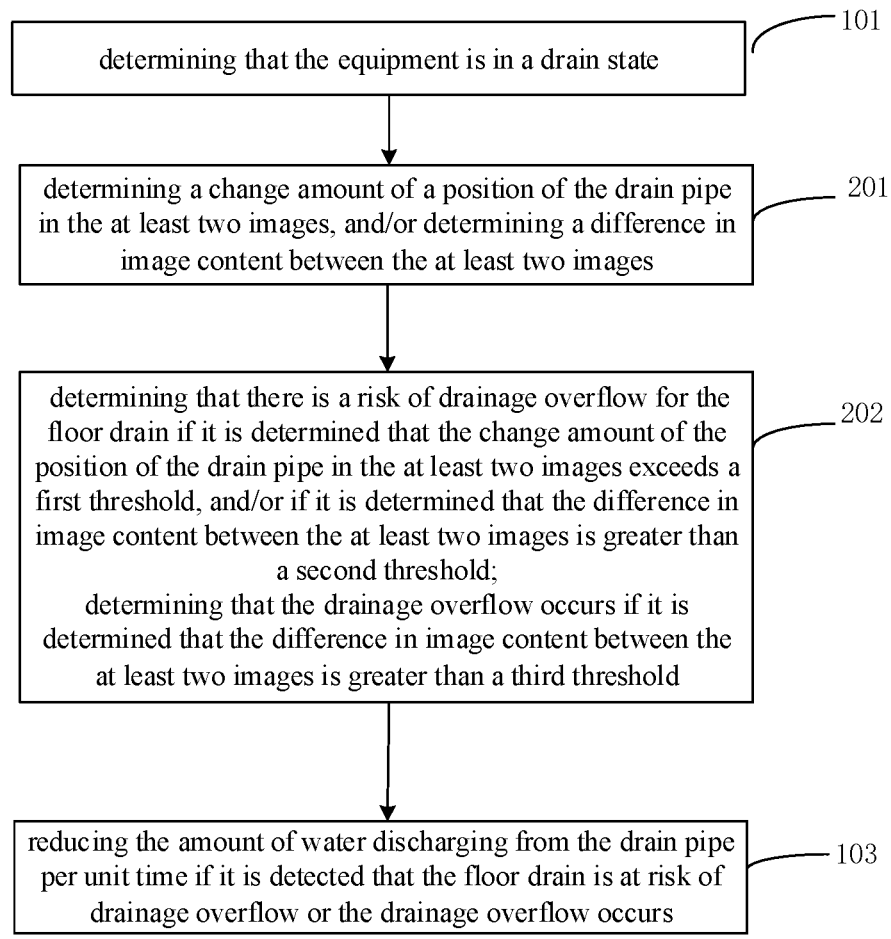
FIG. 2 is a flow chart of a method for controlling drainage of equipment according to an example.

FIG. 2 is a flow chart of a method for controlling drainage of equipment according to an example. As shown in FIG. 2, determining whether the floor drain is at risk of drainage overflow or the drainage overflow occurs according to the image of the drain pipe may be implemented by step 201 and step 202.

In step 201, determining a change amount of a position of the drain pipe in the at least two images, and/or determining a difference in image content between the at least two images. In step 202, when it is determined that the change amount of the position of the drain pipe in the at least two images exceeds a first threshold, and/or when it is determined that the difference in image content between the at least two images is greater than a second threshold, it is determined that there is a risk of drainage overflow in the floor drain (i.e. the floor drain is at risk of drainage overflow); when it is determined that the difference in image content between the at least two images is greater than a third threshold, it is determined that the drainage overflow occurs.

It may be determined that the drain pipe shakes sharply when it is determined that the change amount of the position of the drain pipe in the at least two images exceeds a first threshold. It may be determined that there are water droplets overflowing around the drain pipe when it is determined that the difference in image content between the at least two images is greater than a second threshold. And it may be determined that the floor drain is at risk of drainage overflow when the drain pipe shakes sharply and/or water droplets overflow around the drain pipe. When it is determined that the difference in image content between the at least two images is greater than a third threshold, it may be considered that the water in the floor drain has overflowed to a large extent, so it is determined that the drainage overflow occurs. A related image recognition algorithm may be used to determine the change amount of the position of the drain pipe in the image or the difference of the content between the images; and the image recognition algorithm will not be described again here.

In a practical manner, the sound around the drain pipe and/or around the floor drain may be periodically collected during the drainage process of the equipment. For example, the sound may be collected every four or five seconds. A microphone may be installed near the connection between the drain pipe and the floor drain of the equipment, and the microphone may be used to collect the sounds around the drain pipe and/or around the floor drain. The equipment may also communicate with devices in its vicinity, such as with a mobile phone or smart speaker, requesting a mobile phone or smart speaker to collect sound around the drain and/or around the floor drain.

Figure 3:
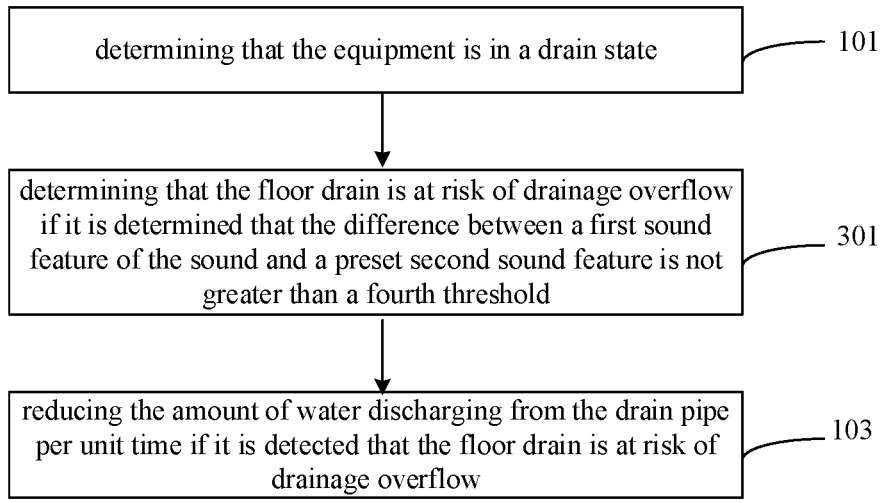
FIG. 3 is a flow chart of a method for controlling drainage of equipment according to an example.

FIG. 3 is a flow chart of a method for controlling drainage of equipment according to an example. As shown in FIG. 3, determining whether the floor drain connected to the drain pipe is at risk of drainage overflow according to the sound around the drain pipe may include: step 301, when it is determined that the difference between a first sound feature of the sound around the drain pipe and a preset second sound feature is not greater than a fourth threshold, it is determined that the floor drain is at risk of drainage overflow. The preset second sound feature may be a feature of sound around the drain pipe and/or the floor drain when there is a risk of drainage overflow in the floor drain, and the sound feature may be collected and stored in advance, and the sound feature may be, for example, a voice print. When it is determined that the difference between the first sound feature and a preset second sound feature is not greater than a fourth threshold, it may be considered that the collected sound around drain pipe and/or the floor drain is the same as the sound corresponding to the preset second sound feature, thereby it is determined that there is a risk of drainage overflow in the floor drain.

The first threshold, the second threshold, the third threshold, and the fourth threshold are the values that can be preset according to actual conditions.

In a practical manner, the water level in the floor drain may be periodically collected during the draining process of the equipment, for example, the water level may be collected every four or five seconds. The water in the floor drain may be collected by setting a water immersion sensor in the floor drain, and the water level may be used to determine whether the floor drain is at risk of drainage overflow. In addition, a drain rate detecting equipment may be installed in the floor drain to detect the drain rate of the floor drain, and then the drain rate of the floor drain may be used to determine whether there is a risk of drainage overflow or whether a drainage overflow has occurred.

Figure 4:
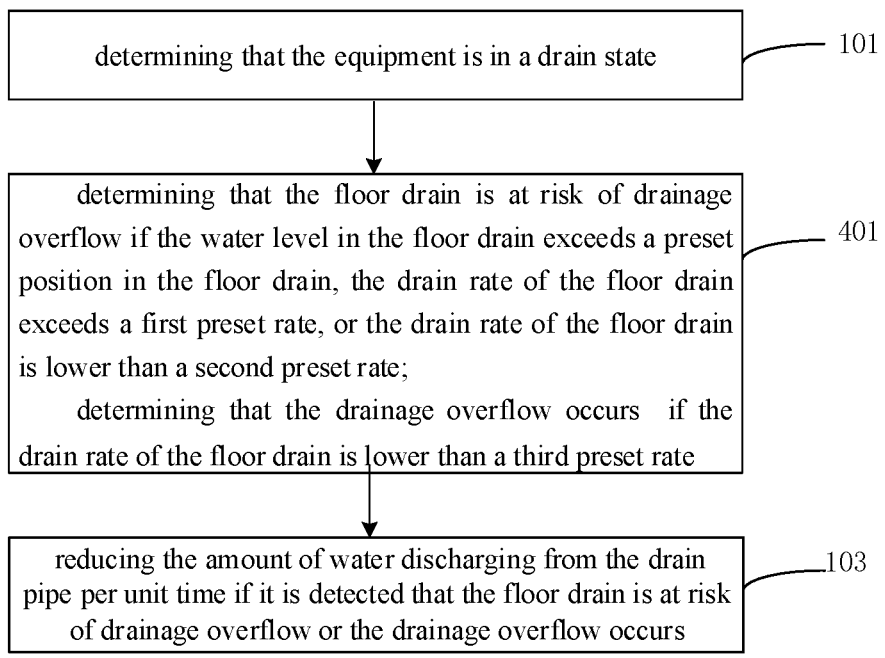
FIG. 4 is a flow chart of a method for controlling drainage of equipment according to an example.

FIG. 4 is a flow chart of a method for controlling drainage of equipment according to an example. As shown in FIG. 4, determining whether the floor drain is at risk of drainage overflow or the drainage overflow occurs according to the water level in the floor drain and/or the drain rate of the floor drain may include: step 401, it is determined that the floor drain is at risk of drainage overflow when the water level in the floor drain exceeds a preset position in the floor drain, the drain rate of the floor drain exceeds a first preset rate, or the drain rate of the floor drain is lower than a second preset rate; it is determined that the drainage overflow occurs when the drain rate of the floor drain is lower than a third preset rate. The first preset rate may be greater than the second preset rate, and the second preset rate may be greater than the third preset rate. When the drain rate of the floor drain is greater than the first preset rate, it indicates that the drain rate of the floor drain is too fast; at this time, the amount of water discharged from the equipment may be greater than the amount of water discharged from the floor drain. When the equipment continues to drain in the current drainage rate, overflow may soon occur for the floor drain. Thus, when the drain rate of the floor drain is detected to be greater than the first preset rate, it may be determined that the floor drain has the risk of drainage overflow. When the drainage rate of the floor drain is less than the second preset rate, there may be a blockage of the floor drain, resulting in a lower drainage rate. In this case, when the equipment continues to drain into the floor drain, it is likely to cause drainage overflow. Thus, when the drainage rate of the floor drain is detected to be less than the second preset rate, it may be determined that the floor drain is at risk of drainage overflow. When the drainage rate at the floor drain is lower than the third preset rate, for example, the third preset rate is 0, it indicates that the current floor drain has been completely blocked, and cannot continue to drain water, so it is determined that the drainage overflow occurs.

Figure 5:
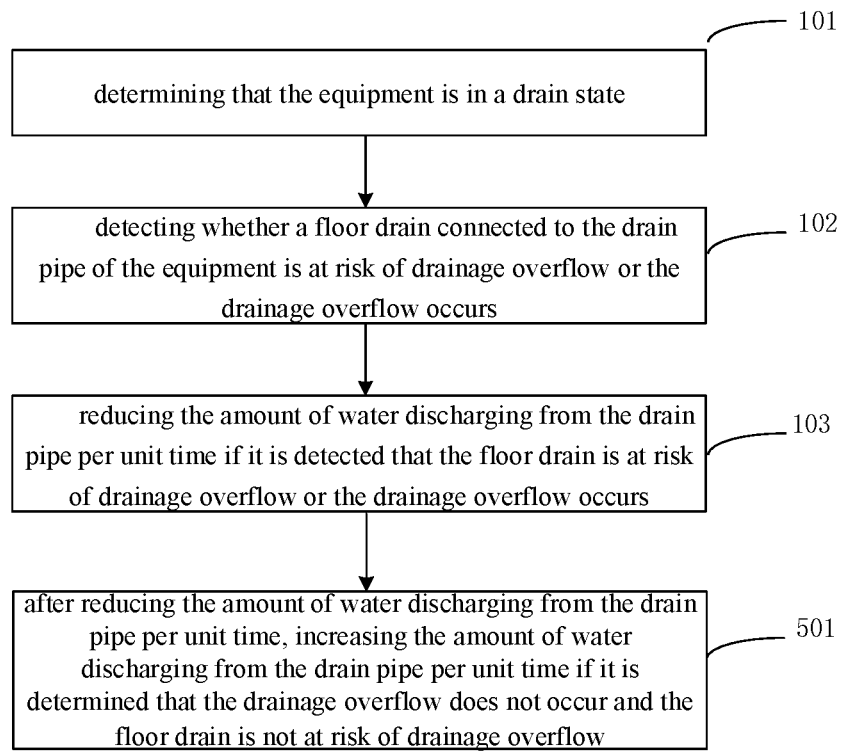
FIG. 5 is a flow chart of a method for controlling drainage of equipment according to an example.

FIG. 5 is a flow chart of a method for controlling drainage of equipment according to an example. As shown in FIG. 5, on the basis of the method shown in FIG. 1, the method of FIG. 5 may further include: step 501, after reducing the drain amount of the drain pipe per unit time or the amount of water discharging from the drain pipe per unit time, increasing the drain amount of the drain pipe per unit time when it is determined that the drainage overflow does not occurs and there is no risk of drainage overflow. It may be determined whether the floor drain is not at risk of drainage overflow and drainage overflow does not occur according to at least one of: sound around the drain, water level in the floor drain, and drain rate of the floor drain. Determining that the floor drain does not have a drain overflow and there is no risk of drainage overflow may be that, for example, when the change amount of the position of the drain pipe in at least two images around the drain pipe that is taken at different times does not exceed the first threshold and when the difference in image content between the at least two images is not greater than the second threshold, it is determined that there is no risk of drainage overflow. Optionally, when it is determined that the difference between the first sound feature of the sound around the collected drain pipe and the preset second sound feature is greater than a fourth threshold, it is determined that there is no risk of drainage overflow. Optionally, when the water in the floor drain does not exceed the preset position in the floor drain, it is determined that there is no risk of drainage overflow, or when the drain rate of the floor drain is not higher than the first preset rate and not lower than the second preset rate, it is determined that there is no risk of drainage overflow. Controlling the drain pipe to increase the amount of water discharging per unit time may be controlling the amount of water discharging per unit time to return to the amount that was discharged per unit time before the operation of reducing the water discharging per unit time. Or, according to the control logic of the controller in the equipment, the amount of water discharging from the drain pipe per unit time is increased according to the drainage demand. It is also possible to increase the amount of water discharging from the drain pipe per unit time by controlling the electronic valve in the drain pipe to increase the opening degree, or the amount of water discharging from the drain pipe per unit time can be increased by increasing the power of the water pump in the control device, thereby increasing the amount of water discharging from the drain pipe per unit time without the risk of drainage overflow, and completing the drain as soon as possible.

Figure 6:
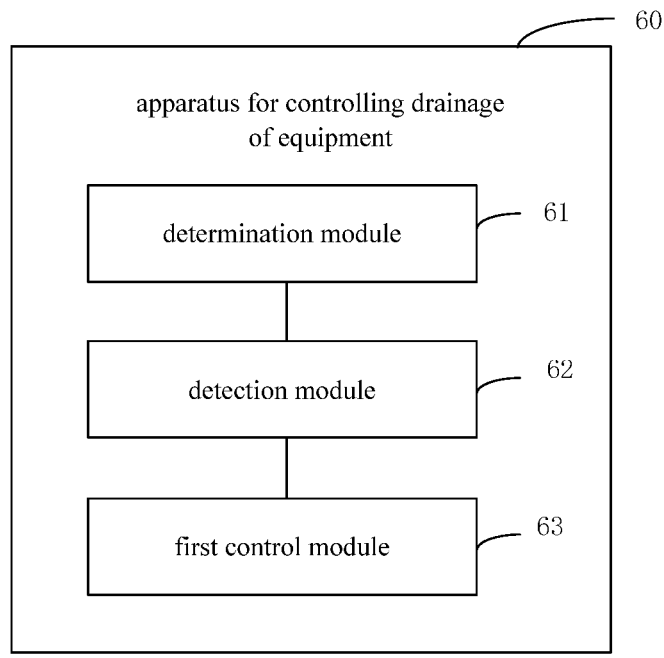
FIG. 6 is a block diagram of an apparatus for controlling drainage of equipment according to an example.

FIG. 6 is a block diagram of an apparatus for controlling drainage of equipment according to an example, wherein, the equipment is provided with a drain pipe. As shown in FIG. 6, the apparatus 60 includes:

a determination module 61, configured to determine that the equipment is in a drain state;

a detection module 62, configured to detect whether a floor drain connected to a drain pipe of the equipment is at risk of drainage overflow or a drainage overflow occurs; and a first control module 63, configured to reduce an amount of water discharging from the drain pipe per unit time when it is detected that the floor drain is at risk of drainage overflow or drainage overflow occurs.

In a practical manner, the detection module is configured to: detect whether the floor drain is at risk of drainage overflow or drainage overflow occurs according to at least one of following data: an image of the drain pipe, a sound around the drain pipe, a water level in the floor drain, and a drain rate of the floor drain.

Figure 7:
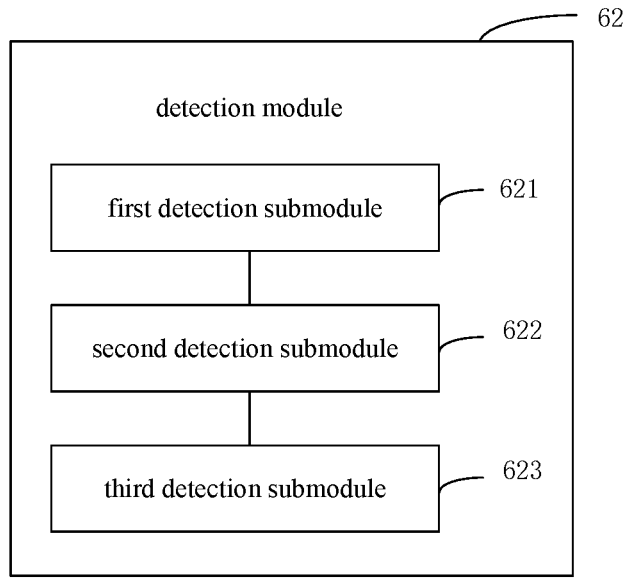
FIG. 7 is a block diagram of a detection module according to an example.

In a practical manner, the image of the drain pipe includes at least two images of the drain pipe collected at different times. FIG. 7 is a block diagram of a detection module according to an example. As shown in FIG. 7, the detection module 62 may include:

a first detection submodule 621, configured to determine a change amount of a position of the drain pipe in the at least two images, and/or determine a difference in image content between the at least two images;

a second detection submodule 622, configured to determine that there is a risk of drainage overflow in the floor drain, when it is determined that the change amount of the position of the drain pipe in the at least two images exceeds a first threshold, and/or when it is determined that the difference in image content between the at least two images is greater than a second threshold; and a third detection submodule 623, configured to determine that the drainage overflow occurs when it is determined that the difference in image content between the at least two images is greater than a third threshold.

In a practical manner, the detection module is configured to: determine that the floor drain is at risk of drainage overflow when it is determined that the difference between a first sound feature of the sound and a preset second sound feature is not greater than a fourth threshold.

In a practical manner, the detection module may include: a fourth determination submodule, configured to determine that the floor drain is at risk of drainage overflow when the water level in the floor drain exceeds a preset position in the floor drain, the drain rate of the floor drain exceeds a first preset rate, or the drain rate of the floor drain is lower than a second preset rate; and a fifth determination submodule, configured to determine that the drainage overflow occurs when the drain rate of the floor drain is lower than a third preset rate.

Figure 8:
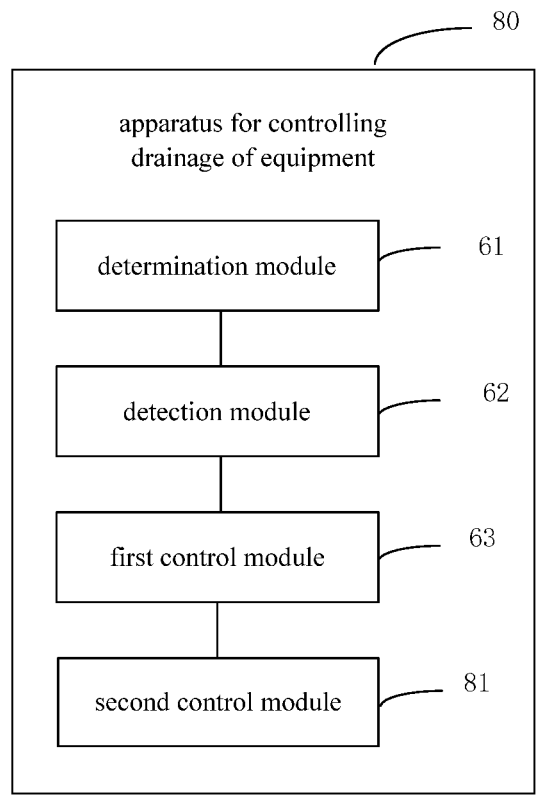
FIG. 8 is a block diagram of an apparatus for controlling drainage of equipment according to an example.

FIG. 8 is a block diagram of an apparatus for controlling drainage of equipment according to an example. As shown in FIG. 8, on the basis of the apparatus 60 shown in FIG. 6, the apparatus 80 further includes: a second control module 81, configured to, after reducing the amount of water discharging from the drain pipe per unit time, increase the amount of water discharging from the drain pipe per unit time when it is determined that the drainage overflow does not occur and there is no risk of drainage overflow.

With regard to the apparatus in the above examples, the specific manner in which the respective modules perform the operations has been described in detail in the examples relating to the method, and will not be explained in detail herein.

Figure 9:
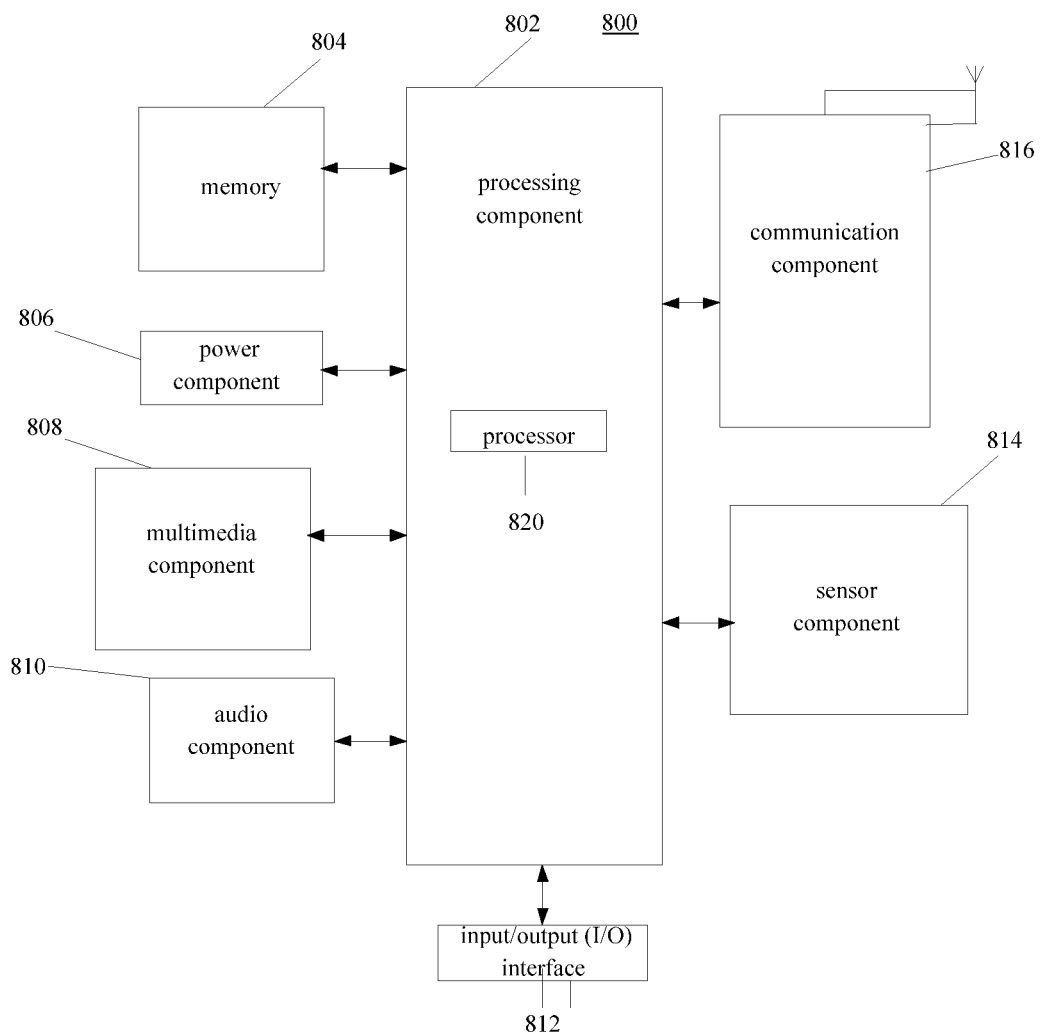
FIG. 9 is a block diagram of an apparatus for controlling drainage of equipment according to an example.

FIG. 9 is a block diagram of an apparatus for controlling drainage of equipment according to an example. For example, the apparatus 800 may be a mobile phone, a computer, a digital broadcast terminal, a messaging device, a gaming console, a tablet device, a medical device, a fitness device, a personal digital assistant, and the like.

With reference to FIG. 9, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some examples, the screen may include a liquid crystal display (LCD) and a touch panel (TP). When the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some examples, the multimedia component 808 includes a front camera and/or a rear camera. The front camera and the rear camera may receive an external multimedia data while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some examples, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components such as the display and the keypad of the apparatus 800, a change in position of the apparatus 800 or a component of the apparatus 800, a presence or absence of user contact with the apparatus 800, an orientation or an acceleration/deceleration of the apparatus 800, and/or a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In one example, the communication component 816 receives a broadcast signal or broadcast associated information from an external broadcast management system via a broadcast channel. In one example, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some examples, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some examples, there is provided an apparatus 800 for controlling drainage of equipment, wherein the equipment is provided with a drain pipe, and the apparatus 800 includes: the processor 820; and the memory 804 for storing instructions executable by the processor 820; wherein the processor 820 is configured to: determine that the equipment is in a drain state; detect whether a floor drain connected to the drain pipe of the equipment is at risk of drainage overflow or a drainage overflow occurs; and reduce an amount of water discharging from the drain pipe per unit time when it is detected that the floor drain is at risk of drainage overflow or the drainage overflow occurs. The processor 820 may be configured to operate as the determination module 61, the detection module 62, the first control module 63, the first detection submodule 621, the second detection submodule 622, the third detection submodule 623, the fourth determination submodule, the fifth determination submodule, and/or the second control module 81.

In some examples, there is also provided a non-transitory computer-readable storage medium including instructions, such as included in the memory 804, executable by the processor 820 in the apparatus 800, for performing the above-described methods. For example, the non-transitory computer-readable storage medium may be a ROM, a RAM, a CD-ROM, a magnetic tape, a floppy disc, an optical data storage device, and the like.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes can be made without departing from the scope thereof.

What is claimed is:

1. A method for controlling drainage of equipment, the method comprising:
   determining that the equipment is in a drain state, wherein the equipment comprises a drain pipe;

detecting whether a floor drain connected to the drain pipe of the equipment is at risk of drainage overflow or a drainage overflow occurs; and reducing an amount of water discharging from the drain pipe per unit time in response to detecting that the floor drain is at risk of drainage overflow or the drainage overflow occurs;

wherein detecting whether the floor drain connected to the drain pipe of the equipment is at risk of drainage overflow or the drainage overflow occurs comprises:

detecting whether the floor drain is at risk of drainage overflow or the drainage overflow occurs according to an image of the drain pipe;

wherein the image of the drain pipe comprises at least two images of the drain pipe collected at different times, and determining whether the floor drain connected to the drain pipe is at risk of drainage overflow or the drainage overflow occurs according to the image of the drain pipe comprises:

determining a change amount of a position of the drain pipe in the at least two images, or determining a difference in image content between the at least two images;

determining that there is a risk of drainage overflow for the floor drain if it is determined in response to determining that the change amount of the position of the drain pipe in the at least two images exceeds a first threshold, or in response to determining that the difference in image content between the at least two images is greater than a second threshold; and determining that the drainage overflow in response to determining that the difference in image content between the at least two images is greater than a third threshold.

2. The method according to claim 1, wherein detecting whether the floor drain connected to the drain pipe of the equipment is at risk of drainage overflow or the drainage overflow occurs further comprises:

detecting whether the floor drain is at risk of drainage overflow or the drainage overflow occurs according to at least one of following data: a sound around the drain pipe, a water level in the floor drain, and a drain rate of the floor drain.

3. The method according to claim 2, wherein determining whether the floor drain connected to the drain pipe is at risk of drainage overflow according to the sound around the drain pipe comprises:

determining that the floor drain is at risk of drainage overflow in response to determining that a difference between a first sound feature of the sound and a preset second sound feature is not greater than a fourth threshold.

4. The method according to claim 2, wherein determining whether the floor drain connected to the drain pipe is at risk of drainage overflow or the drainage overflow occurs according to the water level in the floor drain and the drain rate of the floor drain comprises:

determining that the floor drain is at risk of drainage overflow in response to that the water level in the floor drain exceeds a preset position in the floor drain, the drain rate of the floor drain exceeds a first preset rate, or the drain rate of the floor drain is lower than a second preset rate; and determining that the drainage overflow occurs in response to that the drain rate of the floor drain is lower than a third preset rate.

5. The method according to claim 1, wherein the method further comprises:

after reducing the amount of water discharging from the drain pipe per unit time, increasing the amount of water discharging from the drain pipe per unit time in response to determining that the drainage overflow does not occur and the floor drain is not at risk of drainage overflow.

6. An apparatus for controlling drainage of equipment, the apparatus comprising:

a processor; and a memory for storing instructions executable by the processor;

wherein the processor is configured to:

determine that the equipment is in a drain state, wherein the equipment is provided with a drain pipe;

detect whether a floor drain connected to the drain pipe of the equipment is at risk of drainage overflow or a drainage overflow occurs; and reduce an amount of water discharging from the drain pipe per unit in response to determining that the floor drain is at risk of drainage overflow or the drainage overflow occurs;

wherein to detect whether the floor drain connected to the drain pipe of the equipment is at risk of drainage overflow or the drainage overflow occurs, the processor is further configured to:

detect whether the floor drain is at risk of drainage overflow or the drainage overflow occurs according to an image of the drain pipe;

wherein the image of the drain pipe comprises at least two images of the drain pipe collected at different times, and to determine whether the floor drain connected to the drain pipe is at risk of drainage overflow or the drainage overflow occurs according to the image of the drain pipe, the processor is further configured to:

determine a change amount of a position of the drain pipe in the at least two images, or determining a difference in image content between the at least two images;

determine that there is a risk of drainage overflow for the floor drain or in response to determining that the change amount of the position of the drain pipe in the at least two images exceeds a first threshold, or in response to determining that the difference in image content between the at least two images is greater than a second threshold; and determine that the drainage overflow occurs or in response to determining that the difference in image content between the at least two images is greater than a third threshold.

7. The apparatus according to claim 6, wherein the processor is further configured to:

detect whether the floor drain is at risk of drainage overflow or the drainage overflow occurs according to at least one of following data: a sound around the drain pipe, a water level in the floor drain, and a drain rate of the floor drain.

8. The apparatus according to claim 7, wherein the processor is further configured to:

determine that the floor drain is at risk of drainage overflow in response to determining that a difference between a first sound feature of the sound and a preset second sound feature is not greater than a fourth threshold.

9. The apparatus according to claim 7, wherein the processor is further configured to:

determine that the floor drain is at risk of drainage overflow in response to that the water level in the floor drain exceeds a preset position in the floor drain, the drain rate of the floor drain exceeds a first preset rate, or the drain rate of the floor drain is lower than a second preset rate; and determine that the drainage overflow occurs in response to that the drain rate of the floor drain is lower than a third preset rate.

10. The apparatus according to claim 7, wherein the processor is further configured to:

after the amount of water discharging from the drain pipe per unit time is reduced, increase the amount of water discharging from the drain pipe per unit time in response to determining that the drainage overflow does not occur for the floor drain and there is no risk of drainage overflow.

11. The apparatus according to claim 6, wherein the processor is further configured to:

after the amount of water discharging from the drain pipe per unit time is reduced, increase the amount of water discharging from the drain pipe per unit time in response to determining that the drainage overflow does not occur for the floor drain and there is no risk of drainage overflow.

12. The apparatus according to claim 6, wherein the processor is further configured to:

after the amount of water discharging from the drain pipe per unit time is reduced, increase the amount of water discharging from the drain pipe per unit time in response to determining that the drainage overflow does not occur for the floor drain and there is no risk of drainage overflow.

13. The apparatus according to claim 8, wherein the processor is further configured to:

after the amount of water discharging from the drain pipe per unit time is reduced, increase the amount of water discharging from the drain pipe per unit time in response to determining that the drainage overflow does not occur for the floor drain and there is no risk of drainage overflow.

14. The apparatus according to claim 9, wherein the processor is further configured to:

after the amount of water discharging from the drain pipe per unit time is reduced, increase the amount of water discharging from the drain pipe per unit time in response to determining that the drainage overflow does not occur for the floor drain and there is no risk of drainage overflow.

15. A non-transitory computer-readable storage medium having instructions stored therein, wherein the instructions, when executed by a processor, causes the processor to perform:

determining that equipment is in a drain state;

detecting whether a floor drain connected to a drain pipe of the equipment is at risk of drainage overflow or a drainage overflow occurs; and reducing an amount of water discharging from the drain pipe per unit time in response to determining that the floor drain is at risk of drainage overflow or the drainage overflow occurs;

wherein detecting whether the floor drain connected to the drain pipe of the equipment is at risk of drainage overflow or the drainage overflow occurs comprises:

detecting whether the floor drain is at risk of drainage overflow or the drainage overflow occurs according to an image of the drain pipe;

wherein the image of the drain pipe comprises at least two images of the drain pipe collected at different times, and determining whether the floor drain connected to the drain pipe is at risk of drainage overflow or the drainage overflow occurs according to the image of the drain pipe comprises:

determining a change amount of a position of the drain pipe in the at least two images, or determining a difference in image content between the at least two images;

determining that there is a risk of drainage overflow for the floor drain in response to determining that the change amount of the position of the drain pipe in the at least two images exceeds a first threshold, or in response to determining that the difference in image content between the at least two images is greater than a second threshold; and determining that the drainage overflow occurs in response to determining that the difference in image content between the at least two images is greater than a third threshold.

16. The non-transitory computer-readable storage medium according to claim 15, wherein the instructions further cause the processor to perform:

detecting whether the floor drain is at risk of drainage overflow or the drainage overflow occurs according to at least one of following data: a sound around the drain pipe, a water level in the floor drain, and a drain rate of the floor drain.

17. The non-transitory computer-readable storage medium according to claim 16, wherein the instructions further cause the processor to perform:

determining that the floor drain is at risk of drainage overflow in response to determining that a difference between a first sound feature of the sound and a preset second sound feature is not greater than a fourth threshold.

* * * * *